United States Patent
McKinney

(10) Patent No.: US 7,895,934 B2
(45) Date of Patent: Mar. 1, 2011

(54) APPARATUS FOR GENERATING ELECTRICITY THROUGH OSCILLATORY MOTION

(76) Inventor: Paul McKinney, Lawtey, FL (US)

( * ) Notice: Subject to any disclaimer, the term of this patent is extended or adjusted under 35 U.S.C. 154(b) by 471 days.

(21) Appl. No.: 12/113,494

(22) Filed: May 1, 2008

(65) Prior Publication Data

US 2009/0273188 A1    Nov. 5, 2009

(51) Int. Cl.
*F03B 13/20*    (2006.01)
*F03G 3/00*    (2006.01)

(52) U.S. Cl. ............................................ 92/71; 185/30

(58) Field of Classification Search ............... 92/71; 185/4, 27, 29, 30; 290/1 R
See application file for complete search history.

(56) References Cited

U.S. PATENT DOCUMENTS

| | | | | |
|---|---|---|---|---|
| 244,799 | A | * | 7/1881 | Dye ............................. 92/71 |
| 680,833 | A | * | 8/1901 | Banning et al. ............... 185/30 |
| 1,584,293 | A | * | 5/1926 | Hegenbarth ................... 185/30 |
| 3,258,979 | A | * | 7/1966 | Alsept ......................... 185/29 |
| 4,915,196 | A | * | 4/1990 | Krisko ......................... 185/27 |
| 5,048,356 | A | * | 9/1991 | Levko ............................ 74/60 |
| 2003/0160454 | A1 | * | 8/2003 | Manolis et al. ............ 290/1 R |

* cited by examiner

*Primary Examiner*—Thomas E Lazo
(74) *Attorney, Agent, or Firm*—Schmid PA

(57) ABSTRACT

Disclosed is an apparatus and method for generating energy through oscillatory motion requiring little input. Oscillatory motion is generated using a substantially circular trough containing a liquid, inflatable bags positioned below the trough and a movable weight. The trough is pivotally connected to a central point about which it oscillates. Sustained oscillatory motion is encouraged by inflating and deflating the bags in coordination with the movable weight within the trough and a biased member upon which the bags reside. The oscillatory motion may be captured and transferred to rotary motion which may be used to drive a generator.

17 Claims, 3 Drawing Sheets

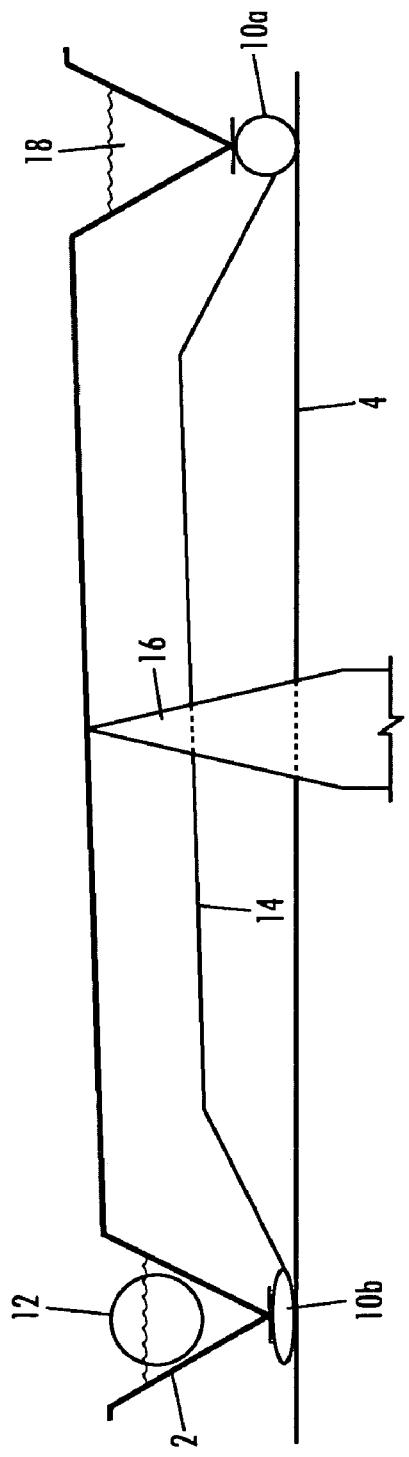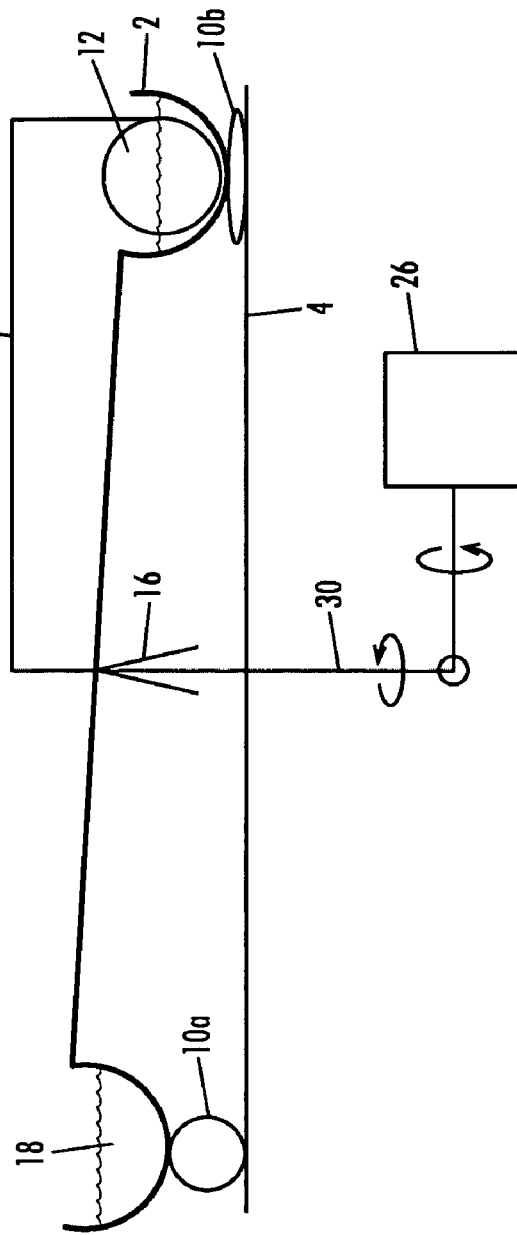

APPARATUS FOR GENERATING ELECTRICITY THROUGH OSCILLATORY MOTION

TECHNICAL FIELD

The present invention relates to an apparatus for generating electricity and in greater detail the invention relates to an apparatus for generating electricity using oscillatory motion requiring little energy input.

BACKGROUND

The generation of electrical energy is subject to various constraints arising from the adverse effects of this generation. These constraints are due, on the one hand, to the long-term availability of energy obtained from fossil fuels and the pollution which their combustion causes, and, on the other hand, to the uncertain yield of the two main replacement energies, namely wind power and solar power, and, finally, to the safety problem and to the unpopularity of extending the use of nuclear energy.

The adverse effects, taken as a whole, of the generation of electrical energy has two important consequences: on the one hand, the investment volume grows increasingly and, on the other hand, the deterioration of the environment becomes more appreciable every day.

In the past, a number of systems were known for generating power. For example, U.S. Pat. No. 85,220 discloses a rotating ball motor wherein an annular tilting tray forms the orbit for a revolving ball. A lever extending into the tray connects with a shaft to which motion is to be imparted. By continually changing the position of the tray, the ball is caused to rotate therein and act on the lever to impart motion to the shaft.

Another patent disclosing a device for producing power is described in U.S. Pat. No. 244,779 wherein a horse-power mechanism combines a continuously acting lever and an endless inclined plane. The plane can be a circular disc pivoted at its center on a ball and socket to enable the disc to oscillate by the weight of a draft animal moving around the perimeter of the disc.

It is also known to provide a plurality of levers which are connected to a crankshaft whereby movement of the levers through the pressure of a heavy weight causes the rotation of a rod and power transmitting generator.

Therefore what is needed is a need for method of generating energy through oscillation which is environmentally friendly.

SUMMARY

The present invention comprises an apparatus and method for generating energy through oscillatory motion using a fluid and with little input. The apparatus includes a substantially circular trough containing a liquid, inflatable bags and a movable weight. The trough is pivotally connected to a central point about which it oscillates. Oscillatory motion is encouraged by inflating and deflating the bags underneath the trough and in coordination with the movable weight within the trough. The bags are inflated on a stationary biased member causing the pivotally mounted trough to rise relative to the biased member as the bags are inflated. The opposite is true when the bags are deflated. Thus, oscillatory motion of the tough is encourages. The oscillatory motion is captured and transferred to rotary motion through any known means which may be used to drive a generator.

In greater detail, the present invention includes an apparatus for generating energy through oscillatory motion using a liquid comprising a substantially circular trough for containing the liquid therein. The liquid within the trough may be any liquid such as water or oil. The trough may be open to the air or sealed in a closed cylindrical tube.

Further included is a plurality of inflatable bags fluidly connected to at least one other bag. Typically, the inflatable bags are filled with air. The inflatable bags are distributed underneath the trough and work in cooperation with a fixed biased member to lift the trough relative to the biased member when the bags are inflated. And of course the opposite is true when the bags are deflated. The bags may have various degrees of inflation at any one moment in time. For example, a series of bags may have varying degrees of inflation as to encourage oscillation in one direction at a desired slope. Of course other configurations of inflation and deflation of the bags are contemplated, including but not by limitation the bags may be inflated alternatively and not in series.

The oscillatory motion of the trough is partially encouraged via a pivot assembly pivotally attached to a center of the trough. Additionally, oscillation is encouraged via a movable weight positioned within the trough. Typically, the movable weight is a weighed ball, but other configurations are contemplated so long as the weight can move about the liquid filed trough. The weight travels about the trough and encouraging the trough to engage the inflatable bags residing on the biased member as the trough oscillates about the pivot assembly to provide the needed pressure to drive the fluid from the bag engaged by the weight.

Further included is a drive mechanism for transferring the oscillatory motion to rotary motion. The drive mechanism may be comprised of a plurality of push rods attached to the outer periphery of the trough. The drive mechanism may be also comprised of a rod having a first end connected to the movable weight within the trough and a second end connected to a rotary shaft positioned at the center of the trough.

The present apparatus may also include a biased member. The biased member may include in an embodiment a substantially circular rail operatively aligned with and positioned below the trough to limit the degree of oscillation by the trough. The biased member further provides a surface upon which the inflatable bags rest and a resisting force in the compression of the bags as the trough oscillates about the pivot point.

The present apparatus for generating energy through oscillatory motion may include in an additional embodiment an electrical generator operatively connected to the drive mechanism. Additionally a computing device may be used for controlling the oscillation of the trough directing the flow of fluid between the bags by the computing device.

In a further embodiment, the present invention includes a method of generating energy through oscillatory motion. The method begins with filling a substantially circular trough with a liquid and setting in oscillatory motion the substantially circular trough. Additionally, the method includes revolving a movable weight positioned within the trough about the periphery the trough. Further included are the steps of deflating and inflating a plurality of inflatable bags underneath the trough and then transferring the oscillatory motion of the trough to rotary motion. The method also includes directing the deflating and inflating of the inflatable bags underneath the trough as to encourage continued oscillatory motion.

DRAWINGS

In the drawings:

FIG. 2 is a cutaway view of the apparatus showing the inflatable bag underneath the trough and in combination with the movable weight;

Figure 4:
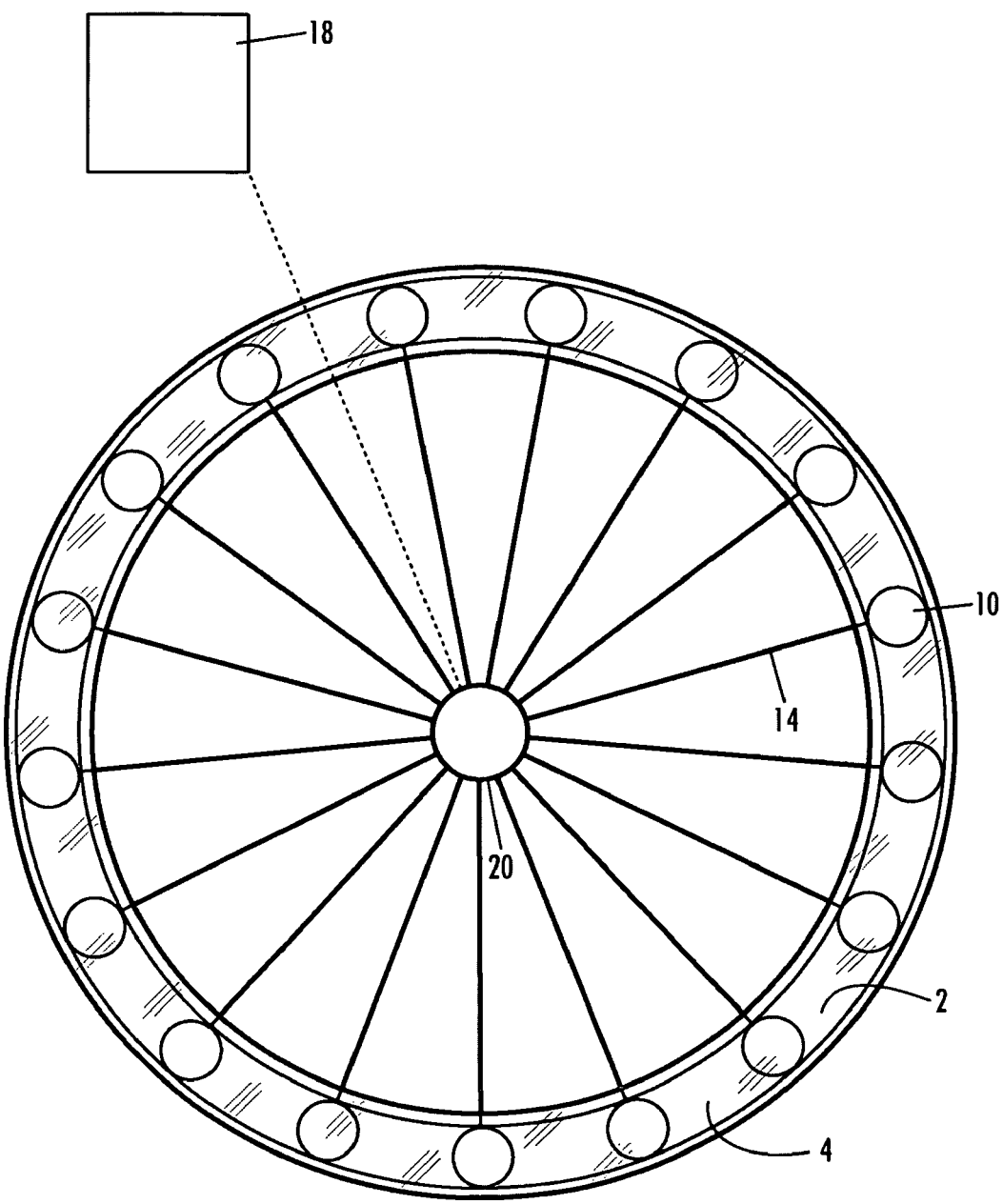

FIG. 3 is further cutaway of an embodiment of the present apparatus depicting the drive mechanism for transferring the oscillatory motion to rotary motion having a rod with a first end connected to the movable weight within the trough and a second end connected to a rotary shaft positioned at the center of the trough; and FIG. 4 depicts a top down view of the present apparatus showing the inflatable bags underneath the trough and interconnected in combination with a computing device.

DETAILED DESCRIPTION

Disclosed is an apparatus and method for generating energy through oscillatory motion needing little energy input. Oscillatory motion is generated using a substantially circular trough containing a liquid, a movable weight and inflatable bags positioned underneath the trough. The trough is pivotally connected to a central point about which it oscillates.

Sustained oscillatory motion is encouraged by inflating and deflating the bags underneath the trough in coordination with the movable weight within the trough. The bags are located between a biased member, typically a ring below the trough, and the bottom portion of the trough. The bottom portion of the trough is that portion opposite the trough side containing the water and weight. As the bags are inflated they push down on the biased member which is fixed and up against the bottom portion of the trough. The trough is pivotally mounted such that the periphery of the trough, or that portion containing the water and weight, is lifted up relative to the biased member. Thus, oscillatory motion within the trough is encouraged by the inflating of the bags and of course deflating of the bags which causes the trough to fall relative to the biased member. The oscillatory motion may be captured and transferred to rotary motion which may be used to drive a generator.

Referring now in greater detail to the drawings in which like numerals indicate like items throughout the several views, FIGS. 1-4 depict the present apparatus for generating energy through oscillatory motion, in the various embodiments of the present invention.

Figure 1:
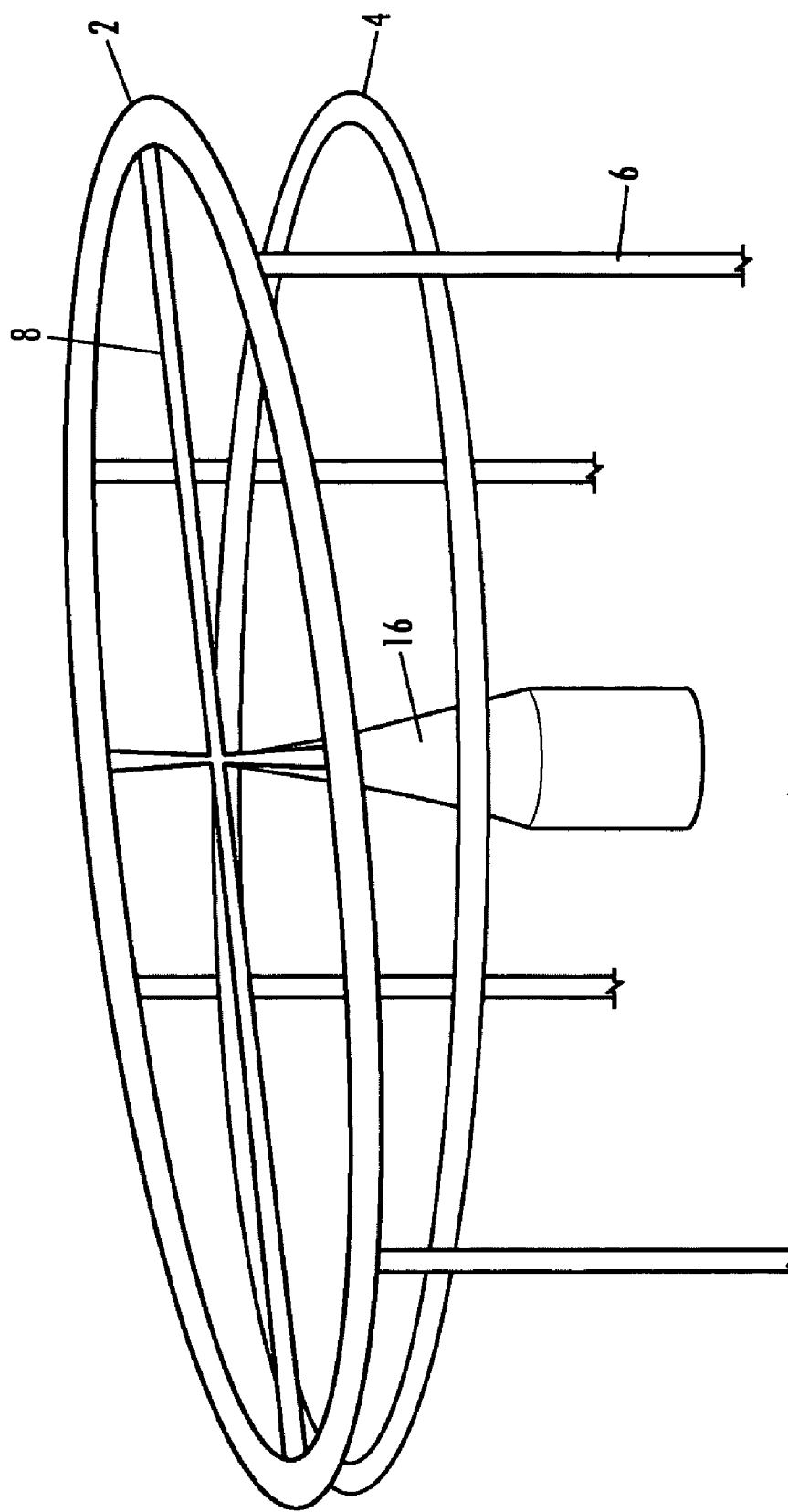
FIG. 1 is an overall view of the apparatus for generating energy through oscillatory motion showing the trough and guide rail in combination with the plurality of push rods attached to the outer periphery of the trough.

Turning now to FIG. 1 is illustrated overall view of the apparatus for generating energy through oscillatory motion showing the trough 2 and guide rail 4 in combination with the plurality of push rods 6 attached to the outer periphery of the trough 2. The trough 2 may include various support members 8. The support members 8 can resemble the hub and spook design shown in FIG. 1 or the support member 8 may be a solid disk. Of course the support member 8 may take on any shape or form capable of supporting the trough 2 in an oscillatory motion.

The drive mechanism of the apparatus embodied in FIG. 1 includes the push rods 6 translating the oscillatory motion of the trough 2 to a vertical up and down motion which can be translated into a rotary motion for powering an electrical generator. The vertical motion of the push rods 6 can be translated into rotary motion using most any known means including a cam assembly.

Additionally illustrated in FIG. 1 is an embodiment wherein the biased member 4 comprises a substantially circular rail 4 operatively aligned with and positioned below the trough 2 to limit the degree of oscillation by the trough 2.

FIG. 2 depicts a cutaway view of the apparatus showing an inflatable bag 10(a-b) positioned beneath the trough 2 in combination with a movable weight 12. The movable weight 12 may be any type of weight capable of traveling through the trough 2 as the trough oscillates about the pivot assembly 16. In one embodiment the movable weight 12 is a weighted ball typically formed from a metal such as stainless steel or lead. Additionally, the movable weight may be in the form of a movable carriage (not shown). The movable carriage may include wheels and weighted so at to encourage the trough 2 to engage the inflatable bags 10(a-b) positioned beneath the trough 2.

The plurality of inflatable bags 10(a-b) are fluidly connected to each other via most any means such as a conduit 14 as shown in FIG. 2. The inflatable bag 10(a) is deflated when the movable weight encourages the trough 2 to engage and deflate the inflatable bag 10(a) below the trough 2. The expelled fluid from the inflatable bag 10(a) is directed to a second inflatable bag 10(b). The portion of the trough 2 with the inflated bag 10(b) beneath it is encourage up and away from the guide rail 4 so that the trough rises relative to a plane created by the guide rail 4. The lifting of the tough 2 by the inflation and deflation of the bags 10(a-b) encourage the oscillation of the trough 2.

The inflatable bags 10(a-b) may be formed from most any material capable of holding and expelling a fluid upon pressure being applied to the bag. For example the inflatable bags 10(a-b) may be formed from a resilient material such as rubber or synthetic rubber shaped into a bag or balloon container for holding the fluid and being fluidly connect to the conduit 14 typically through a port created in the inflatable bag 10(a-b).

As shown in FIG. 3 is an additional embodiment of the drive mechanism for transferring the oscillatory motion to rotary motion including a rod 28 having a first end connected to the movable weight 12 within the trough 2 and a second end connected to a rotary shaft 30 positioned at the center of the trough 2. The pivot assembly 16 may be of any assembly supporting the trough 2 and allowing oscillation.

Additionally shown in FIG. 3 are the inflatable bags 10(a-b) in communication with the trough and guide rail 4. The tough is lifted by the inflated bag 10a biased against the guide rail 4.

FIG. 4 depicts a top down view of the present apparatus wherein the trough 2 is shown in a transparent view to show the inflatable bags 10 underneath and interconnected in combination with a computing device 18. The computing device 18 controls in part the oscillation of the trough 2 by directing the flow of fluid between the bags. By injecting a fluid such as air into a bag 10, that portion of the trough 2 lifted by the bag 10 biased against the guide rail 4 and the trough 4.

The distribution of the fluid to the bags 10 can be aided by a central hub 20 controlled by the computer 18. The central hub 20 may be comprised of valves for directing fluid to the bags 10. Typically, the fluid in the bags 10 is air and the liquid 18 in the trough 2 is water. However, the liquid 18 may be comprised of oil, water, and mixtures thereof such as emulsions.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of any claims that are derivable from the description herein, and any and all equivalents thereof.

What is claimed is:

1. An apparatus for generating energy through oscillatory motion using a liquid comprising:
   a substantially circular trough for containing the liquid therein;
   a plurality of inflatable bags fluidly connected to at least one other bag, the inflatable bags distributed underneath the trough;
   a pivot assembly pivotally attached to a center of the trough;
   a movable weight positioned within the trough,
   a biased member operatively aligned with the inflatable bags whereby the biased member in combination with the trough compresses the bag as the weight travels about the trough and encourages a portion of the trough towards the biased member; and
   a drive mechanism for transferring the oscillatory motion to rotary motion.

2. The apparatus for generating energy through oscillatory motion of claim 1, wherein the biased member includes a guide rail comprising a substantially circular rail operatively aligned with and positioned below the trough to limit the degree of oscillation by the trough.

3. The apparatus for generating energy through oscillatory motion of claim 1, wherein the drive mechanism for transferring the oscillatory motion to rotary motion includes a plurality of push rods attached to the outer periphery of the trough.

4. The apparatus for generating energy through oscillatory motion of claim 1, wherein the drive mechanism for transferring the oscillatory motion to rotary motion includes a rod having a first end connected to the movable weight within the trough and a second end connected to a rotary shaft positioned at the center of the trough.

5. The apparatus for generating energy through oscillatory motion of claim 1, wherein the movable weight includes a weighted ball.

6. The apparatus for generating energy through oscillatory motion of claim 1, further including an electrical generator operatively connected to the drive mechanism.

7. The apparatus for generating energy through oscillatory motion of claim 1, further including a computing device for controlling the oscillation of the trough wherein the computing device directs the flow of fluid between the bags.

8. The apparatus for generating energy through oscillatory motion of claim 1, wherein the liquid is selected from the group consisting essentially of water, oils and combinations thereof.

9. The apparatus for generating energy through oscillatory motion of claim 1, wherein the fluid filling the inflatable bags is air.

10. The apparatus for generating energy through oscillatory motion of claim 1, wherein the trough comprises a closed cylindrical tube.

11. An apparatus for generating energy through oscillatory motion using a liquid comprising:
   a substantially circular trough for containing the liquid therein,
   a plurality of inflatable bags fluidly connected to at least one other bag, the inflatable bags distributed beneath the trough;
   a computing device for controlling the oscillation of the trough wherein the computing device directs the flow of fluid between the bags;
   a pivot assembly pivotally attached to a center of the trough;
   a movable weight positioned within the trough;
   a biased member operatively aligned with the inflatable bags whereby the biased member in combination with the trough compresses the bag as the weight travels about the trough and encourages a portion of the trough towards the biased member; and
   a drive mechanism for transferring the oscillatory motion to rotary motion.

12. The apparatus for generating energy through oscillatory motion of claim 11, wherein the biased member comprises a substantially circular rail operatively aligned with and positioned below the trough to limit the degree of oscillation by the trough and to provide a biased surface for compressing the bags.

13. The apparatus for generating energy through oscillatory motion of claim 11, wherein the movable weight is selected from the group consisting essentially of a weighted ball, a carriage assembly and combinations thereof.

14. The apparatus for generating energy through oscillatory motion of claim 11, wherein the drive mechanism for transferring the oscillatory motion to rotary motion includes a plurality of push rods attached to the outer periphery of the trough.

15. The apparatus for generating energy through oscillatory motion of claim 11, wherein the drive mechanism for transferring the oscillatory motion to rotary motion includes a rod having a first end connected to the movable weight within the trough and a second end connected to a rotary shaft positioned at the center of the trough.

16. A method of generating energy through oscillatory motion comprising the steps of:
   filling a substantially circular trough with a liquid;
   setting in oscillatory motion the substantially circular trough;
   revolving a movable weight positioned within the trough about the periphery the trough;
   deflating and inflating a plurality of inflatable bags underneath the trough; and
   transferring the oscillatory motion of the trough to rotary motion.

17. The method of generating energy through oscillatory motion of claim 16, furthering including directing the deflating and inflating the plurality of inflatable bags within the trough as to encourage continued oscillatory motion.

* * * * *